Patented May 16, 1933

1,909,746

UNITED STATES PATENT OFFICE

HERMANN BECKMANN, OF BERLIN-ZEHLENDORF, GERMANY

RUBBER COATED ARTICLE

No Drawing. Application filed January 7, 1930, Serial No. 419,192, and in Germany November 28, 1928.

My invention refers to linings to be produced on or fixed to the surface of walls, furniture, etc. after the manner of a veneer and has for its particular purpose to provide a veneer of a novel kind which is more resistive against mechanical and chemical action and can be manufactured at less expense than the wooden veneers hitherto employed. Hitherto furniture was coated in most cases with thin sheets of wood called veneers.

I have now found that the wooden veneers can be replaced with great advantage by thin layers or sheets of microporous rubber, for instance such as described in my patent of the United States No. 1,745,657, this rubber product being cured rubber pervaded with substantially uniformly distributed, microscopically visible pores. As described in this patent this rubber product comprises a cured colloidal net of reticulate structure having microscopically visible, filter-size pores.

I have found that if a microporous rubber product is produced in or cut to thin sheets of say 0,1 to 1 mm thickness, either in the form of hard or soft rubber, such sheets being glued onto a surface to be decorated or protected by the veneer, such as a brick or wooden wall, a piece of furniture or the like, the rubber being vulcanized either before or after the parts have been combined, I obtain a lining, which, while resembling the wooden veneers, will be superior to them as far as the resistivity to chemical action is concerned. Apart therefrom the rubber veneer can be adapted to the configuration of the carrier more readily than a wooden veneer and, if applied to brick or steel, a rubber lining of this kind owing to the fact that rubber is a poor heat conductor and that moreover the rubber is pervaded with a great number of microscopically visible pores filled with air, will form an efficient heat insulator. For instance, if steel furniture is provided with such a lining, the cold feel proper to steel will be avoided altogether.

I may also utilize a rubber lining as above described as a protection against heat, for instance in combination with metal articles to be used in a tropical climate, in combination with metal handles for teapots, with stoves, steam piping, etc. If applied to electrical heating devices, a rubber lining of this kind will act both as a heat insulator and as a protection against burning.

In order to produce a lining or veneer of this kind, I may proceed as mentioned above, viz. gluing thin sheets of the porous rubber product onto the surface of the article to be lined therewith. I may, however, also proceed by immersing the article in question into a rubber gel in which the corresponding quantity of sulfur sufficing for vulcanization is incorporated, the lining thus produced on the article being now vulcanized in the usual manner. I may further immerse the article in natural latex or a rubber solution rendered viscous by the addition of a thickening medium and mixed with sulfur, a coagulating agent being added to reduce the latex or rubber solution to a gel which is then vulcanized. I may also apply the lining to the article by spraying onto such article a viscous rubber solution or latex containing sulfur, which is then reduced to a gel. I may also apply to the article a rubber gel by spraying which is then vulcanized. Another mode of proceeding is to precipitate porous rubber, to which sulfur has been added, on the article to be lined by electrolytic action, the lining thus produced being then subjected to vulcanization.

I have further found that I can produce a lining or veneer by pulverizing a microporous vulcanized rubber product, this powder being then applied and fixed by suitable means on the article to be lined. In view of the fact that the pores in the rubber product may be produced with diameters not more than a few thousandths of a millimeter the minute particles of pulverized microporous rubber will still be pervaded by a considerable number of such pores. These particles can be fixed on the article to be lined by means of a suitable agglutinant, by vulcanization or by other means. If the article is coated with an agglutinant and is immersed into pulverized microporous rubber, or if such pulverized rubber product is mixed with an agglutinant, a coherent layer of such rubber product can easily be produced on the article. I may also apply the pulverized microporous rubber product by spraying, and I succeed in this manner to produce extremely thin linings, which can be treated in any desired manner to impart to them the character of true veneers, which will offer a high grade heat insulator.

I may add dye-stuffs to the microporous rubber from the begining, but I may also apply the rubber lining first to the article, for instance sheet metal, and may then apply a paint, lacquer and the like to the lining, which will form a coherent skin on the rubber. The rubber lining may further be polished in the same manner as wood and may be impregnated with wax and the like. I may also act on the surface of the rubber lining with means whereby its surface is formed with grooves or the like exactly like natural wood.

In order to produce a microporous rubber product to be used in the production of a lining or veneer according to the present invention, I may proceed as disclosed in my patent aforesaid, for instance by adding to normal latex some finely subdivided sulfur and a solution of a thickening medium, such as a magnesium salt or a soluble salt of an alkaline earth metal or other dyad metal, the salt solution being diluted with water. After stirring during a few minutes the mixture will become viscous and after about 15 minutes it will be converted into an elastic gel, which is allowed to stand until it has solidified, or in order to effect solidification in a shorter time, is dipped in dilute acid or alcohol. The mass thus obtained is then subjected to vulcanization in the usual manner either before or after having been applied to the article to be lined, care being taken to effect vulcanization in moist air or below water.

I may also expose the jelly, which is still free from vulcanizing agents, to the alternate action of hydrogen sulphide and sulphurous acid.

Instead of using a salt of magnesium or manganese, I may for instance use calcium chloride to thicken the latex and I may expose the thickened latex to the action of sulfur dioxide gas, which is superposed to the body of latex contained in a closed vessel remaining in contact with its surface, whereupon superficial coagulation will take place after a few minutes, the whole mass being converted after the lapse of a few hours into an elastic jelly, which may then be exposed to the action of heat and moisture for vulcanization.

I may also add to a mixture of latex and flowers of sulfur a solution of magnesium sulfate in water, the whole being exposed to the action of sulfur dioxide gas, and the jellylike mass thus obtained being exposed to heat in the presence of moisture for vulcanization.

In some cases the formation of the jelly is preferably carried out in the cold, for instance at temperatures of 5° C.

I may however also use a rubber product obtained by comminuting non-porous hard rubber and uniting the minute rubber particles by vulcanization in such manner that a porous rubber product results. Another product suitable for use can be obtained by coating vulcanized non-porous hard rubber particles with a layer of non- or partly-vulcanized rubber mix which is then subjected to vulcanization.

Various changes may be made in the details disclosed in the foregoing specification without departing from the invention or sacrificing the advantages thereof.

In the specification and the claims the term "microporous rubber product" is intended to include all rubber products, no matter in which manner they are produced, which are pervaded with minute pores, as distinguished from the well known rubber sponge product.

I claim:

1. An improved manufacture of wood, metal, brick and the like, comprising such a manufacture surfaced with a thin veneer of microporous rubber; the said veneer being in the form of a cured colloidal rubber net of reticulate structure having microscopically visible, filter-size pores.

2. An improved manufacture comprising a metal shape surfaced with a thin veneer of microporous rubber; the said veneer being in the form of a cured colloidal rubber net of reticulate structure having microscopically visible, filter-size pores.

3. An improved manufacture of wood, metal, brick and the like, comprising such a manufacture surfaced with a thin veneer comprising a rubber sheet consisting of a binder uniting together fine particles of microporous rubber having microscopically visible, filter-size pores.

In testimony whereof I affix my signature.

HERMANN BECKMANN.